United States Patent
Campos Perez et al.

(10) Patent No.: US 11,163,674 B1
(45) Date of Patent: Nov. 2, 2021

(54) SYSTEM AND METHOD FOR IDENTIFYING A FAULTY COMPONENT IN A SPECTRUM AMBIGUITY GROUP

(71) Applicant: Palo Alto Research Center Incorporated, Palo Alto, CA (US)

(72) Inventors: Alexandre Campos Perez, San Mateo, CA (US); Eric A. Bier, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 17/035,485

(22) Filed: Sep. 28, 2020

(51) Int. Cl.
  *G06F 9/44* (2018.01)
  *G06F 11/36* (2006.01)
  *G06K 9/62* (2006.01)
  *G06F 11/30* (2006.01)

(52) U.S. Cl.
  CPC ........ *G06F 11/3688* (2013.01); *G06F 11/302* (2013.01); *G06F 11/3072* (2013.01); *G06F 11/3676* (2013.01); *G06F 11/3684* (2013.01); *G06F 11/3692* (2013.01); *G06K 9/6223* (2013.01)

(58) Field of Classification Search
  None
  See application file for complete search history.

(56) References Cited

U.S. PATENT DOCUMENTS

| | | | |
|---|---|---|---|
| 10,678,673 B2 * | 6/2020 | Saha | G06F 11/362 |
| 10,831,645 B1 * | 11/2020 | McNeil | G06F 11/3684 |
| 2008/0059837 A1 * | 3/2008 | Dematteis | G06F 11/2294 714/25 |
| 2008/0059838 A1 * | 3/2008 | Melman | G01R 31/31912 714/25 |
| 2017/0249234 A1 * | 8/2017 | Kalech | G06F 11/3616 |
| 2018/0121822 A1 * | 5/2018 | Aghasaryan | G06F 11/3668 |

* cited by examiner

*Primary Examiner* — Qamrun Nahar
(74) *Attorney, Agent, or Firm* — Shun Yao; Park, Vaughan, Fleming & Dowler LLP (57) ABSTRACT

One embodiment provides a system and method for automatically localizing faults in a software system. During operation, the system executes a number of tests associated with the software system to output a spectrum indicating test-coverage patterns of components within the software system; and identifies, based on the spectrum, an ambiguity group associated with at least one failed test. The ambiguity group includes multiple components having a same coverage pattern. The system instruments the multiple components. Instrumenting a respective component includes inserting instructions for monitoring runtime values of at least one variable. The system identifies a subset of tests within which the instrumented multiple components are active, re-executes the identified subset of tests with the multiple components being instrumented, and identifies one component from the multiple components as being likely to cause the at least one failed test based on results of the re-executed subset of tests.

20 Claims, 8 Drawing Sheets

|  | STATE | $t_1$ | $t_2$ | $t_3$ | $t_4$ |
|---|---|---|---|---|---|
| $c_1$ | name=null | 1 | 0 | 0 | 0 |
| $c_1$ | name≠null | 0 | 0 | 1 | 0 |
| $c_2$ |  | 1 | 0 | 1 | 0 |
| $c_3$ |  | 0 | 0 | 1 | 1 |
| $c_4$ |  | 0 | 1 | 0 | 1 |
| FAILURES |  | 1 | 0 | 0 | 0 |

FIG. 6 ently related to identifying and localizing faults in computer programs. More specifically, it is related to a system and method that can break an ambiguity group to identify fault within the ambiguity group.

SYSTEM AND METHOD FOR IDENTIFYING A FAULTY COMPONENT IN A SPECTRUM AMBIGUITY GROUP

RELATED APPLICATION

This application is related to U.S. patent application Ser. No. 17/035,470, entitled "SYSTEM AND METHOD FOR GENERATING COUNTEREXAMPLE TESTS OF INCIDENTAL INVARIANTS," filed Sep. 28, 2020, which is herein incorporated by reference in its entirety.

BACKGROUND

Field

This disclosure is generally related to identifying and localizing faults in computer programs. More specifically, it is related to a system and method that can break an ambiguity group to identify fault within the ambiguity group.

Related Art

In computer programming and software development, debugging is the process of finding and resolving bugs (defects or problems that prevent correct operation) within computer programs, software, or systems. Debugging a program can be very time-consuming and arduous, and automated debugging tools have been developed.

Spectrum-based fault localization (SFL) is a tool for software development that helps programmers to find those lines of code that are most likely to cause failures of a particular software test or set of tests. SFL works by running a set of test cases (called a test suite) that triggers execution of a body of software that is of interest. For each test, the SFL tool records the outcome of the test (whether it succeeds or fails). It also records the code regions (which can include statements, functions, methods, classes, code blocks, or individual lines of code, depending on a chosen level of granularity) that were active during that test. The SFL tool organizes the resulting information into a table, referred to as a spectrum, with one row for each code region (also referred to as a code component or simply a component), one column for each test, and a final row that encodes whether the test succeeded or failed. The SFL tool then examines the resulting table to find correlations between the components (or sets of components) and the tests. For example, a particular component may be involved in a number of failing or succeeding tests. Components that are associated more strongly with failing tests than succeeding tests are more likely to be the cause of the failure and can be reported to the user as possible sources of the failures.

While SFL can be very useful during software debugging, there are still many cases in which it is unable to make accurate suggestions of fault locations. One such problem results from so-called ambiguity groups. An ambiguity group is a set of components in the spectrum that appear equally likely to be the cause of test failures, because they are active in the same tests and inactive in the same tests. Thus, they are associated with the same test failures and the same test successes. Although only one component within the group is actually responsible for the failures and the other components are innocent, the traditional SFL tool has no way to locate the faulty component within the ambiguity group.

SUMMARY

One embodiment provides a system and method for automatically localizing faults in a software system. During operation, the system executes a number of tests associated with the software system to output a spectrum indicating test-coverage patterns of components within the software system; and identifies, based on the spectrum, an ambiguity group associated with at least one failed test. The ambiguity group includes multiple components having a same coverage pattern. The system instruments the multiple components. Instrumenting a respective component includes inserting instructions for monitoring runtime values of at least one variable. The system identifies a subset of tests within which the instrumented multiple components are active, re-executes the identified subset of tests with the multiple components being instrumented, and identifies one component from the multiple components as being likely to cause the at least one failed test based on results of the re-executed subset of tests.

In a variation on this embodiment, the system further identifies one or more states associated with a component based on the monitored runtime values of the at least one variable, and determines coverage patterns of the component in different states.

In a further variation, identifying the one or more states can include partitioning the monitored runtime values of the at least one variable into a number of subsets, each subset corresponding to a state.

In a further variation, partitioning the monitored runtime values of the at least one variable can include one or more of: applying a landmark-based partitioning technique, applying a cluster-based partitioning technique, and applying a label-based partitioning technique.

In a further variation, the system can generate an augmented spectrum based on results of the re-executed subset of tests. A respective row in the spectrum corresponds to a component in an identified state, and a respective column in the spectrum corresponds to a test.

In a further variation, the at least one variable comprises a numerical variable, and a respective state corresponds to a predetermined numerical range.

In a further variation, the at least one variable comprises a pointer variable, and a respective state corresponds to the pointer variable being null or not null.

In a variation on this embodiment, executing the tests can include performing a number of iterations. In each iteration, the system decreases instrumentation granularity, filters out components that are less likely to cause the at least one failed test based on results of a previous iteration, and executes tests that are affected by remaining components.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The embodiments described herein solve the problem of locating a faulty component within an ambiguity group identified by an SFL tool. More specifically, by revealing component behaviors that are otherwise hidden, the disclosed enhanced fault-localization system adds additional information to the spectrum to break up ambiguity groups. During operation, the system first runs a set of tests to determine one or more ambiguity groups, with each ambiguity group having multiple components equally likely to cause failures in one or more tests. To break up an ambiguity group, the system can instrument the components in the ambiguity group (e.g., by selecting one or more variables and by inserting computer codes in the components to record runtime values of the variables) and run the tests again to output an augmented spectrum. In the augmented spectrum, each component within the ambiguity group can have one or more rows, with each row corresponding to a particular range of values of a particular variable. The system can then identify a faulty component based on the augmented spectrum.

Enhanced Fault-Localization System

Figure 1:
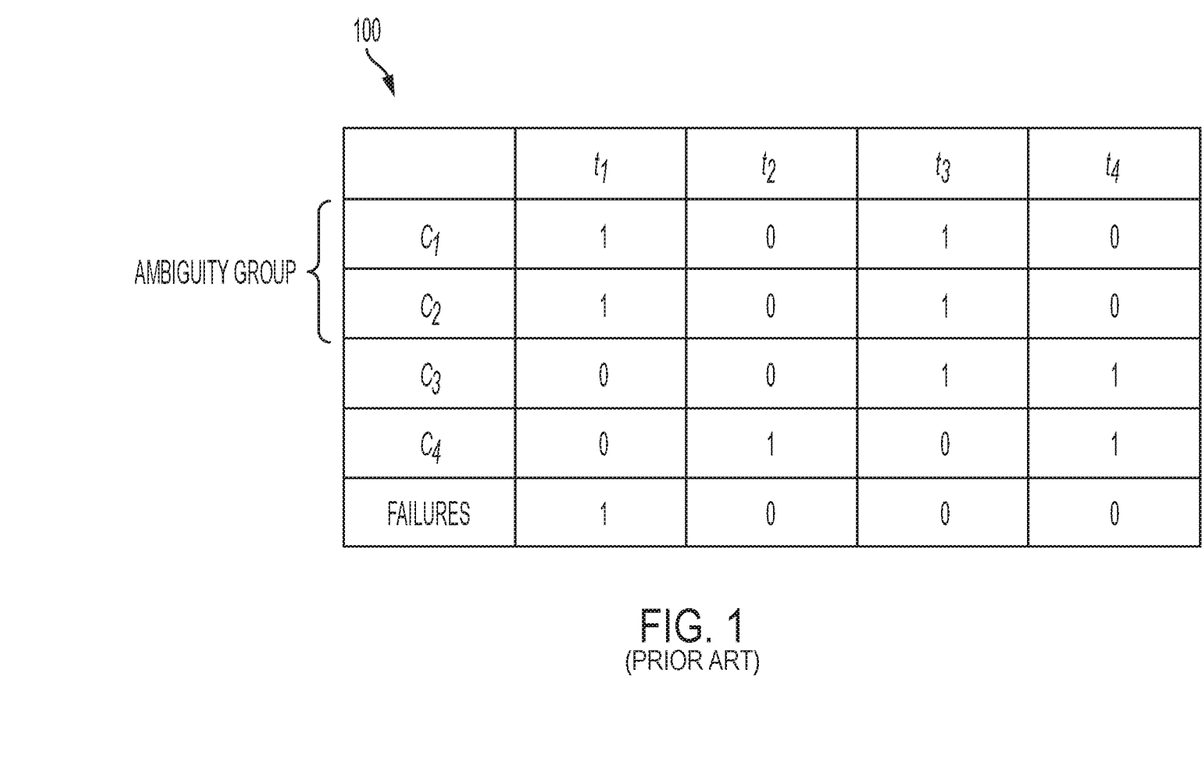
FIG. 1 illustrates an exemplary spectrum outputted by a spectrum-based fault-localization (SFL) system, according to prior art.

FIG. 1 illustrates an exemplary spectrum outputted by a spectrum-based fault-localization (SFL) system, according to prior art. In FIG. 1, spectrum 100 can include a number of rows, each row except for the last one corresponding to a component (e.g., $c_1$, $c_2$, $c_3$, and $c_4$) within a computer program under test. Spectrum 100 can also include a number of columns, each column corresponding to a test (e.g., $t_1$, $t_2$, $t_3$, and $t_4$). Moreover, elements in a particular row inculcate whether the particular component is active in the corresponding tests. For example, in the row of $c_1$, each of the four elements indicates whether component $c_1$ is active in each of the four tests ($t_1$, $t_2$, $t_3$, and $t_4$). In this example, a "0" indicates "not active," whereas a "1" indicates "active." In the example shown in FIG. 1, component $c_1$ is active in tests $t_1$ and $t_3$, whereas component $c_3$ is active in tests $t_3$ and $t_4$. The last row of spectrum 100 indicates the outcomes (e.g., "failed" or "succeeded") of the tests. For example, a "1" can indicate that the corresponding test failed, whereas a "0" can indicate that the corresponding test succeeded. In the example shown in FIG. 1, $t_1$ failed and $t_2$, $t_3$, and $t_4$ succeeded.

From FIG. 1, one can see that components $c_1$ and $c_2$ behave similarly. Both of them are active in tests $t_1$ and $t_3$ and inactive in tests $t_2$ and $t_4$. Therefore, they are equally likely to be the cause of failed test $t_1$. As discussed previously, components $c_1$ and $c_2$ form an ambiguity group, and running the four tests listed in spectrum 100 cannot pinpoint exactly which component within the ambiguity group is faulty. In other words, even though it is possible that only one component ($c_1$ or $c_2$) is, in fact, responsible for the failure of test $t_1$ while the other component is innocent, the results provided by the conventional SFL system cannot provide information to distinguish between these two components. Although in some cases, running additional tests may break the ambiguity group (i.e., components within the ambiguity group may behave differently in those additional tests), in many cases, the ambiguity group may remain unchanged even after running the additional tests.

In some embodiments, in order to identify, within an ambiguity group, the true faulty component, an enhanced SFL system can collect additional information (e.g., state of the components) while running the tests, and output an enhanced spectrum. The enhanced spectrum can include the additional information. More specifically, the same component having different component states can be assigned multiple rows in the enhanced spectrum, with each row representing a particular state of the component. Note that the state of a component can refer to a variable in the component having a particular type of value. For example, a component can include a pointer variable "name," and the component can be considered to be in different component states when the name is null and not null. Similarly, for a numerical variable, the same components can be considered to be in different component states when the value of the numerical variable is positive, negative, and zero; or alternatively, when the value of the numerical variable is greater than or less than a predetermined threshold value.

Figure 2A:
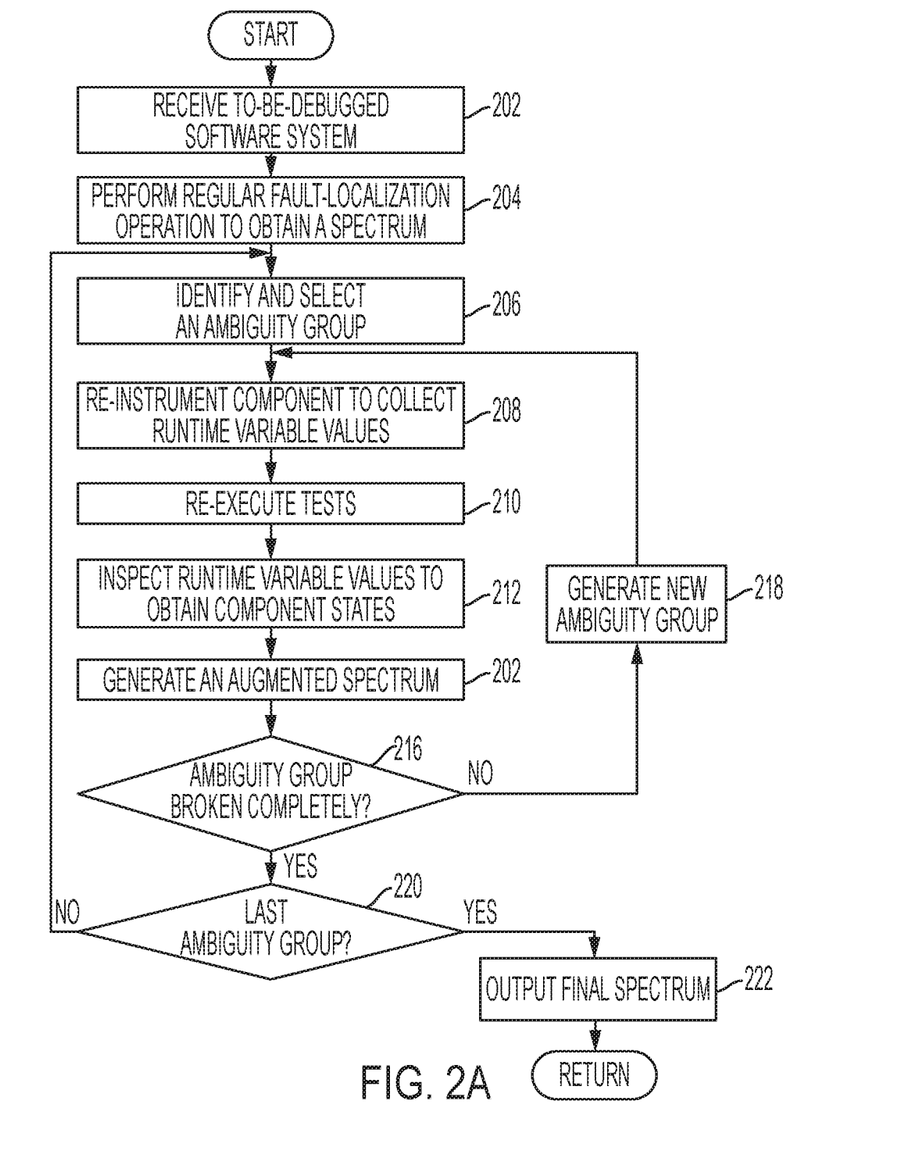
FIG. 2A presents a flowchart illustrating a process for localizing fault within an ambiguity group, according to one embodiment.

FIG. 2A presents a flowchart illustrating a process for localizing fault within an ambiguity group, according to one embodiment. During operation, the fault-localization system receives a software system that is to be debugged (operation 202). The to-be-debugged software system can also be referred to as a system-under-test (SUT), and can include one or more inter-related computer programs. The fault-localization system can first perform a regular fault-localization operation to obtain a regular spectrum (operation 204). Performing the regular fault-localization operation can include running a number of tests (e.g., a test suite that includes a plurality of test cases). Note that running a test on a computer program typically means executing the program under controlled conditions (e.g., by assigning specific input values), and recording which components are active in the test and the outcome (e.g., passed or failed) of the test. A test is passed or succeeded when the execution of the program is completed correctly, and the test is failed when an error is detected. To record such per-test component coverage data, the SUT can be instrumented (i.e., having additional codes inserted in the program to gather runtime data). The regular spectrum can be generated (e.g., by an SFL tool) based on the collected runtime data and can be similar to what is shown in FIG. 1, with the components being various logic sections or code regions of the software system. A component can be a statement, a function, a method, a class, a block of code, a line of code, etc. A programmer or a debugging tool can determine how to divide the SUT into a number of components based on the desired level of granularity.

Figure 2B:
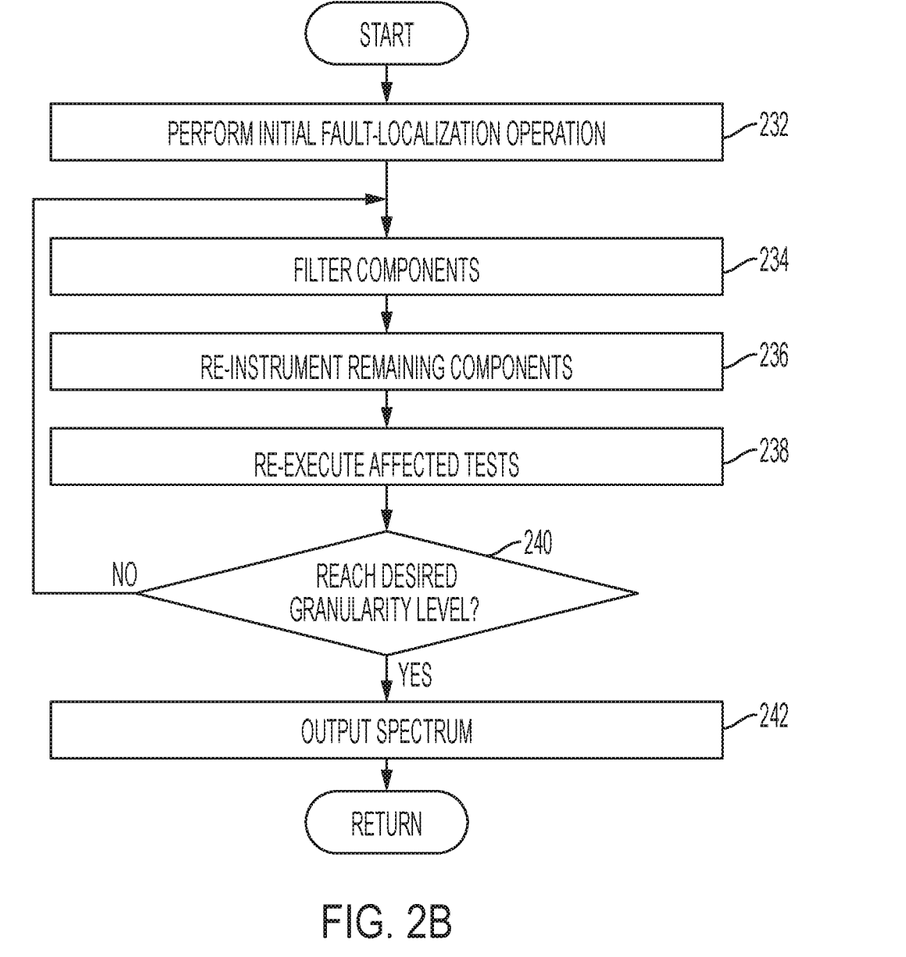
FIG. 2B presents a flowchart illustrating an exemplary fault-localization process, according to one embodiment.

To increase the efficiency of the fault-localization operation, a number of iterations with increased instrumentation granularity can be performed. FIG. 2B presents a flowchart illustrating an exemplary fault-localization process, according to one embodiment. During operation, the system performs an initial fault-localization operation at a larger or coarser level of instrumentation granularity (operation 232). Using Java language as an example, the initial instrumentation can be done at the class level. By examining the spectrum outputted by the initial fault-localization operation, the system can filter out components that are less likely to cause test failure (operation 234) and then re-instrument the remaining components at a higher level of instrumentation granularity (operation 236). Filtering out a component that is less likely to cause test failures can involve counting the number of failed tests in which the component is active. If this number is less than a threshold, the component is filtered out. Re-instrumenting the remaining components can include injecting diagnostic codes at a smaller or finer level of granularity. In the example of the Java language, the levels of granularity (in descending order) can include: packages, classes, methods and statements.

Subsequent to the re-instrumentation, the system can re-execute the affected tests (operation 238). Note that, instead of running all tests, to reduce execution overhead, only those tests in which the re-instrumented components are active will be rerun. More specifically, the system can use the results of the previous test runs to identify tests in which the re-instrumented components are active. This assumes that all tests have deterministic path coverage (i.e., the same set of components will be active each time a given test is run). If the path coverage of a certain test is deterministic, such a test will be rerun, regardless of whether the component is active in that test.

The system can then determine if the desired granularity level has been reached for all currently remaining components (operation 240). If so, the system outputs a final spectrum based on the outcomes of the tests (operation 242). If not, the system returns to operation 224 to filter out additional components based on the outcomes of the tests. This approach to gradually increase the instrumentation granularity can be more scalable than approaches that start with a finer-grained instrumentation, without loss of accuracy.

Returning to FIG. 2A, by examining the spectrum, the fault-localization system can identify and select an ambiguity group that includes multiple components that are equally likely to cause failure of a test (operation 206). More specifically, the system can first identify all ambiguity groups that exist in the spectrum. An ambiguity group can refer to a group of components having the same coverage pattern in tests. In other words, all components in an ambiguity group are active in the same test(s). For each ambiguity group, the system can determine whether the components in the groups are active in one or more failed tests. If so, the ambiguity group is included in a set of candidate groups as a diagnostic candidate. From the set of candidates, the system can select one candidate group to perform the enhanced fault-localization operation. In some embodiments, the system can select, from the candidate groups, a candidate group having the highest fault-likelihood score. Note that the fault-localization system can be configured to assign a fault-likelihood score for each component in the SUT based on certain criteria (e.g., the number of failed tests in which the component is active). Because all components in an ambiguity group have the same coverage pattern, they are all assigned the same fault-likelihood score and this score can be the score of the ambiguity group.

Subsequent to selecting a candidate group, the system can re-instrument the components in the ambiguity group (operation 208). Re-instrumenting a component can include inserting codes or instructions that can facilitate the gathering of additional runtime details. In some embodiments, the additional runtime details can include the values of variables in the component. Because the SUT may include a large number of variables, instrumenting the component for all variables can add a significant amount of execution overhead (e.g., a longer time needed to execute the tests). Therefore, selecting a limited number of variables for observation can reduce the instrumentation overhead. In some embodiments, the variables can be chosen from the lexical scope of the code region. More specifically, the system can determine which variables are within the lexical scope of a particular component, and then re-instrument the particular component by inserting code to monitor and store the runtime values of the determined variables.

After the re-instrumentation, the enhanced fault-localization system can re-execute the affected tests (operation 210). Note that, instead of running all tests, to reduce execution overhead, only those tests in which the re-instrumented components are active will be rerun. More specifically, the system can use the results of the previous test runs to identify tests in which the re-instrumented components are active. This assumes that all tests have deterministic path coverage (i.e., the same set of components will be active each time a given test is run). If the path coverage of a certain test is deterministic, such a test will be rerun, regardless of whether the component is active in that test.

When the tests are executed, further details associated with each component can be gathered, resulting from the instrumentation. Such details are in addition to the coverage data and the pass or fail of the tests. In some embodiments, for each re-instrumented component, the system can store the runtime value of variables within the component's lexical scope. Once the re-executions of the tests are completed, the system can inspect the recorded runtime variable values to determine distinguishing traits associated with the variable values that can be encoded as component states (operation 212). In other words, the system can determine how to partition the runtime variable values into a limited number of sets such that each set of runtime variable values can define a meaningful component state.

Various techniques can be used to determine the distinguishing traits of the variable values. In one embodiment, a type-based landmarking approach can be used, where the system creates landmarking predicates based on the dynamic type of variables. A landmarking predicate is a function that is true or false depending on the values of one or more variables. For example, to landmark numerical values, the fault-localization system can generate three predicates: ">0," "<0," and "==0." Similarly, the system can generate two predicates: "=null" and "!=null" to landmark pointer variables. In addition to the variable type, the landmarks can also be specific to particular variable. For example, if a numerical variable represents temperature value in Fahrenheit, the landmarking predicates can include ">32," "<32," and "=32." In some embodiments, static program-analysis techniques can be used to determine the type of the variables and possible landmarks for the variables. The landmark-based partitioning can be straightforward without needing to run tests. However, such partitioning of variable values may not always be sufficient in breaking the ambiguity group.

Figure 3A:
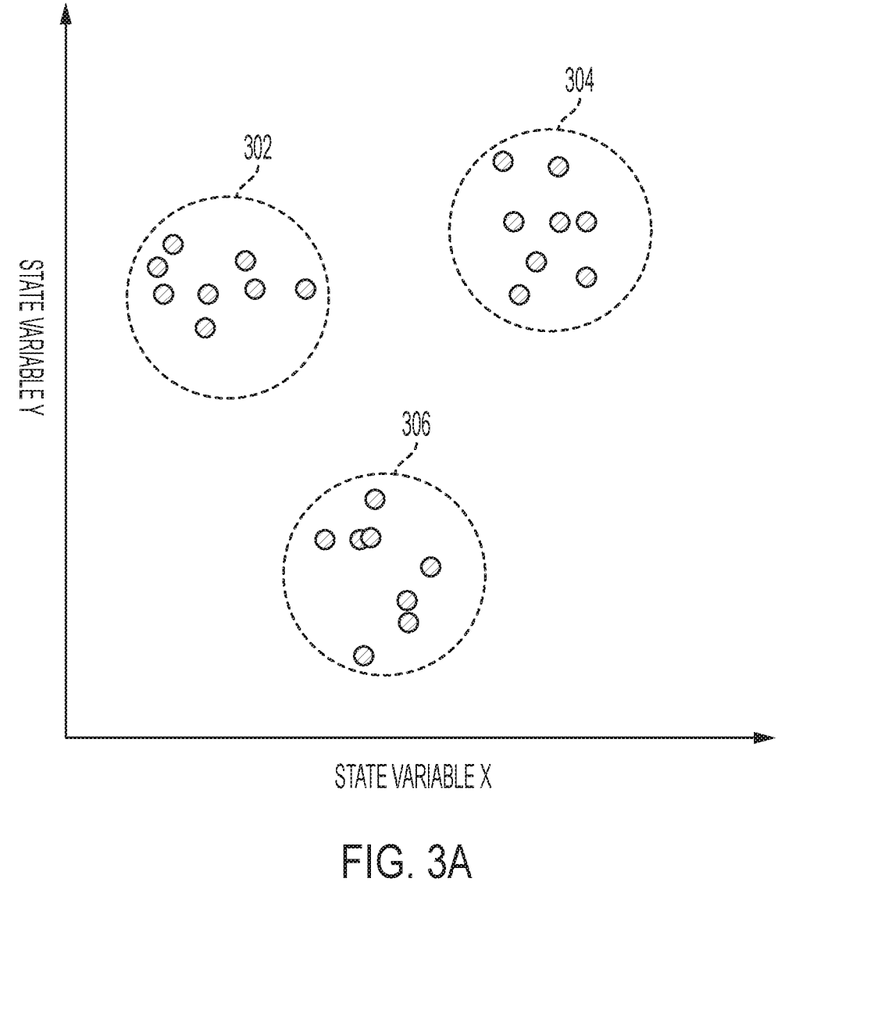
FIG. 3A illustrates exemplary clustering of components, according to one embodiment.

In a different embodiment, the fault-localization system can use a machine-learning technique (e.g., unsupervised clustering), which can group a set of multi-dimensional objects into closely related groups. For example, clustering analysis can be used to cluster components according to their state variable behavior (i.e., runtime values of variables) across test executions and to extrapolate boundary predicates describing to which cluster the components belong. FIG. 3A illustrates exemplary clustering of components, according to one embodiment. In FIG. 3A, each component can be represented according to its variable value. Components with similar state variable behaviors (e.g., variable values within a similar range) can be clustered together, as indicated by the dashed circles. In the example shown in FIG. 3A, three clusters (e.g., clusters 302, 304, and 306) have been produced. The border of each cluster (i.e., the dashed circle) corresponds to the range of the values of the variables of components within such a cluster, and the range can then be used to partition variable values for the purpose of breaking the ambiguity group. Exemplary clustering techniques can include but are not limited to a k-means clustering technique (e.g., X-means) and a density-based clustering technique (e.g., DBSCAN).

Figure 3B:
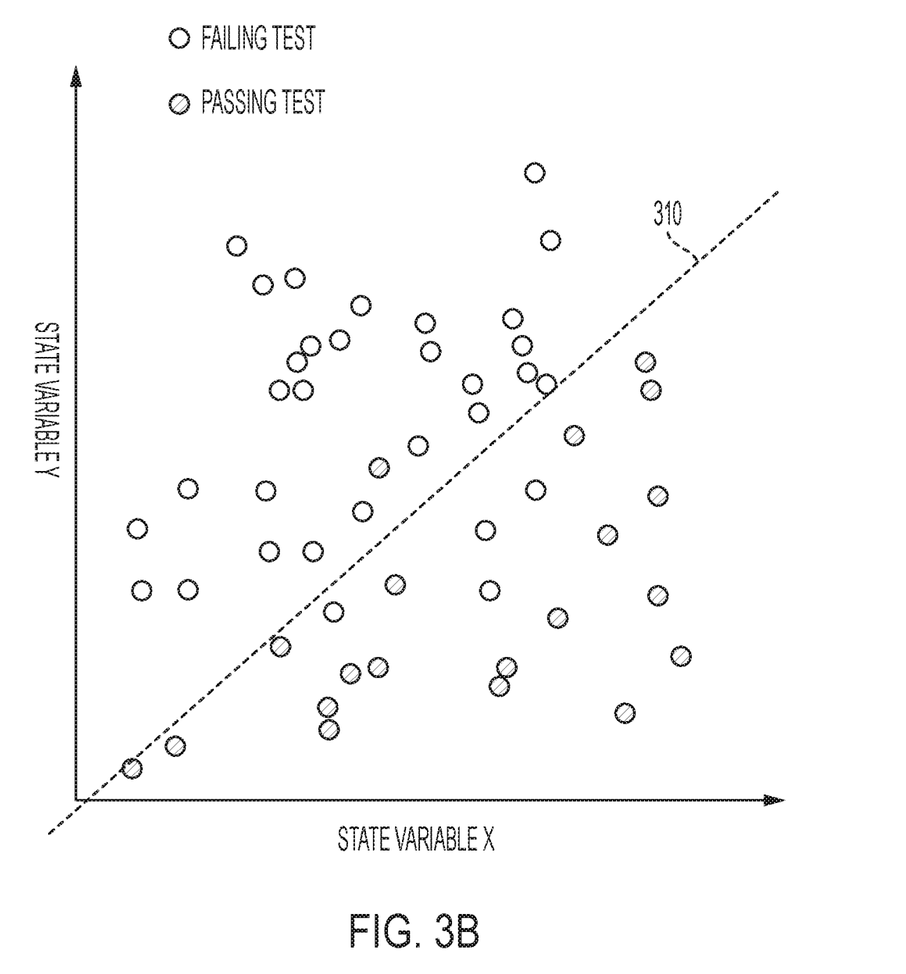
FIG. 3B illustrates exemplary partitioning of labeled predicates, according to one embodiment.

In an alternative embodiment, the fault-localization system can use a supervised machine-learning technique where predicates (variable values) are partitioned based on differences in variable behaviors between passing and failing test runs. FIG. 3B illustrates exemplary partitioning of labeled predicates, according to one embodiment. In FIG. 3B, the observed variable values during the execution of the entire test suite can be labeled as being part of the failed or passed tests, and the partitioning predicate (as indicated by dashed line 310) can be determined based on such labeled data.

Figure 4:
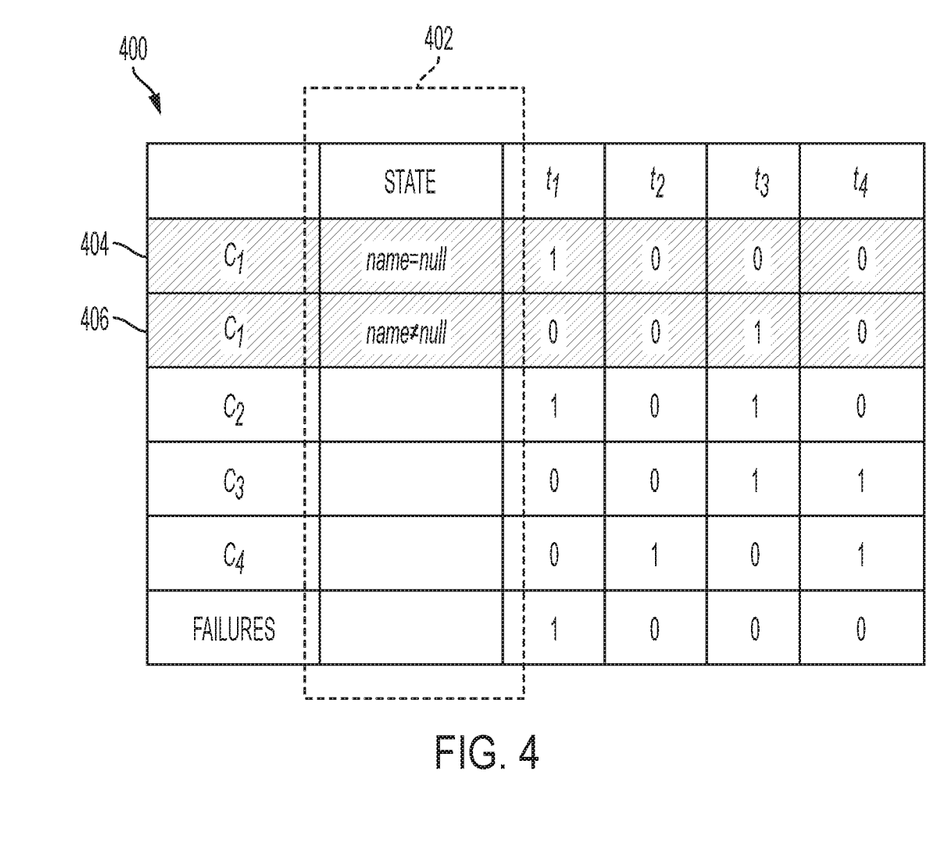
FIG. 4 illustrates an exemplary augmented spectrum, according to one embodiment.

Returning to FIG. 2A, subsequent to generating the distinguishing partitioning of the predicates (or defining the component states), the fault-localization system can generate an augmented spectrum with the rows in the augmented spectrum being different combinations of component and variable value set (operation 214). A single component can correspond to multiple component-and-variable combinations, with each combination assigned a row in the augmented spectrum. FIG. 4 illustrates an exemplary augmented spectrum, according to one embodiment.

Compared with regular spectrum 100 shown in FIG. 1, augmented spectrum 400 includes an additional column 402. Moreover, a single row that corresponds to component $c_1$ is split into two rows, rows 404 and 406. Additional column 402 allows information associated with the state of the components to be included in spectrum 400, and the different rows of a component correspond to the different states (i.e., different runtime variable values) of the component. In the example shown in FIG. 4, component $c_1$ can have two states, with a first state corresponding to the pointer variable "name" being null and the second state corresponding to "name" not being null.

FIG. 4 also shows that the coverage patterns of component $c_1$ can be different when component $c_1$ is in the two different states. More particularly, when component $c_1$ is in the state of name=null, it is active in test $t_1$ and inactive in all other tests. On the other hand, when component $c_1$ is in the state of name≠null, it is active in test $t_3$ and inactive in all other tests. From FIG. 4, one can see that the component-and-variable combination of $c_1$ and name=null is active in the failed test and inactive in all other tests. Consequently, the likelihood of component $c_1$ being the cause of failed test $t_1$ is higher than that of component $c_2$, which is active in passed test $t_3$.

In the example shown in FIG. 4, augmented spectrum 400 includes only one additional column, whereas in practice, multiple additional columns can be added, one for each possible way of partitioning the variable values or each type of component state. For example, if component $c_1$ includes a numerical variable that can be partitioned using different landmarks (e.g., ">0," "<0," and "=0"), an additional column can be generated to allow the different component states to be recorded in augmented spectrum 400. In addition, in the example shown in FIG. 4, only $c_1$ has different states while all other components are stateless. In practice, more than one component can have different component states. For example, in addition to $c_1$, components $c_2$ and $c_4$ may each have multiple component states.

Returning to FIG. 2A, the fault-localization system can inspect the augmented spectrum to determine if the selected ambiguity group has been broken completely (operation 216). If the ambiguity group is not completely broken, or if there are still multiple component-and-variable combinations having the same test coverage pattern, the system generates a new ambiguity group by grouping these component-and-variable combinations (operation 218) and returns to operation 208 to select additional variables for instrumentation (i.e., to inject new codes to collect runtime values of these additional variables). If the current ambiguity group is broken completely, the system determines if this is the last ambiguity group in the regular spectrum (operation 220). If so, the system outputs the final augmented spectrum, with all individual entries (i.e., component-and-variable combinations) having distinct coverage patterns (operation 222). In other words, the final spectrum does not include any ambiguity group. If not, the fault-location system returns to operation 206 to select another ambiguity group.

Figure 5:
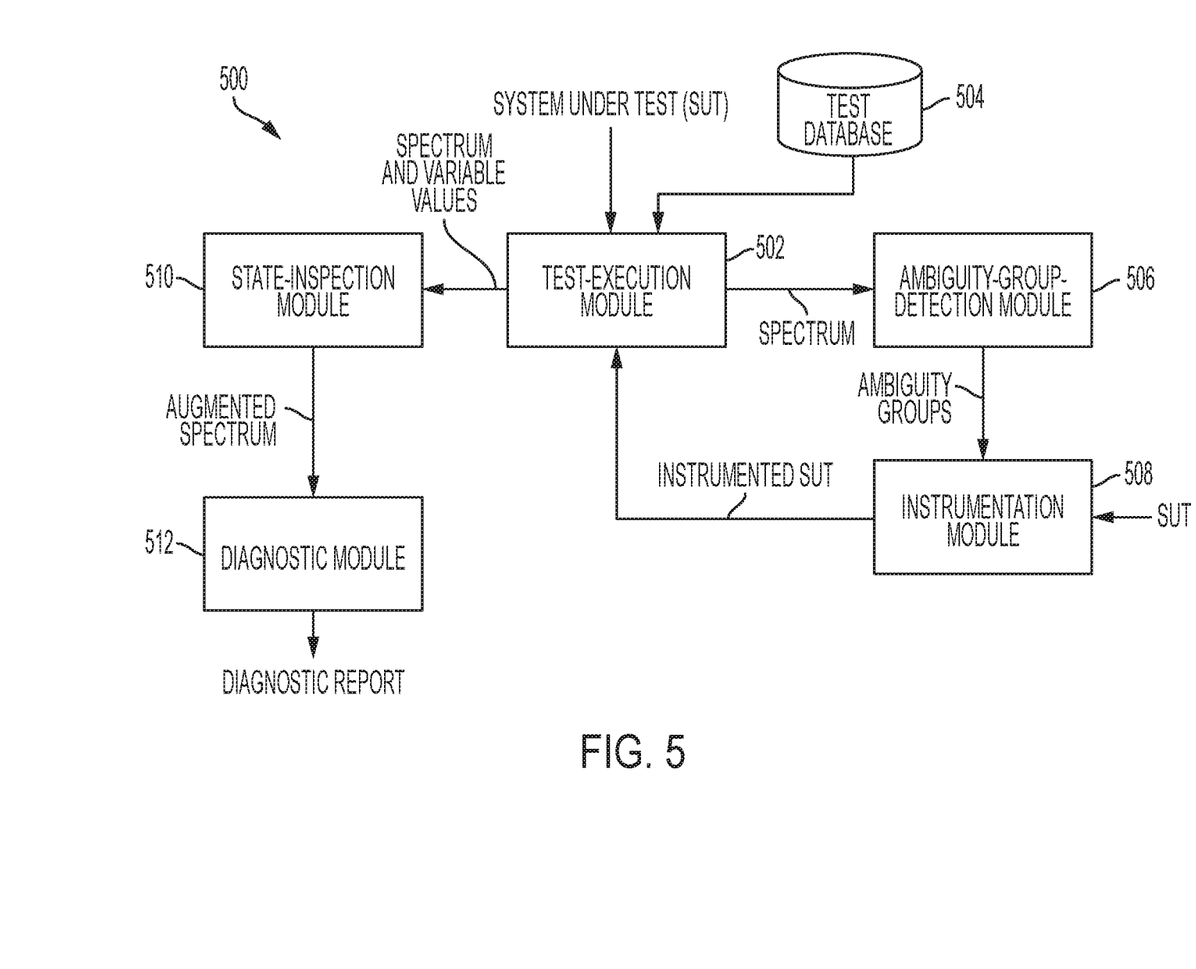
FIG. 5 illustrates an exemplary enhanced fault-localization system, according to one embodiment.

FIG. 5 illustrates an exemplary enhanced fault-localization system, according to one embodiment. Enhanced fault-localization system 500 can include a test-execution module 502, a test database 504, an ambiguity-group-detection module 506, an instrumentation module 508, a state-inspection module 510, and a diagnostic module 512.

During the operation of enhanced fault-localization system 500, test-execution module 502 can receive a system-under-test (SUT) and run a test suite stored in test database 504. The test suite can include a series of tests, which can be generated manually by the software developers or can be automatically generated. Detailed descriptions of automated test generation can be found in copending application Ser. No. 17/035,470, entitled "SYSTEM AND METHOD FOR GENERATING COUNTEREXAMPLE TESTS OF INCIDENTAL INVARIANTS," filed Sep. 28, 2020, which is herein incorporated by reference in its entirety.

After running the tests, test-execution module 502 outputs a spectrum, which can include coverage information associated with a number of components in the SUT. In some embodiments, test-execution module 502 can increase the fault-localization efficiency by running a number of iterations with increased granularity details. In each iteration, test-execution module 502 can filter out components that are unlikely to cause failure (e.g., based on the results from the previous iteration, instrumenting the remaining components using a granularity that is finer than the previous iteration, and executing only those tests that are affected by the instrumented components.

Ambiguity-group-detection module 506 analyzes the spectrum outputted by test-execution module 502 to detect ambiguity groups, with each ambiguity group including multiple components with the same coverage pattern (e.g., those components are active in the same set of tests). Ambiguity-group-detection module 506 can send a selected ambiguity group to instrumentation module 508, which instruments components in the ambiguity group. More specifically, instrumentation module 508 can be configured to insert codes into components within the ambiguity group to record runtime values of one or more selected variables. The variables can be selected based on the component's lexical scope. To distinguish the instrumentation that collects runtime variable values from standard instrumentation used by SFL systems, one can also refer to this instrumentation as variable-value-instrumentation.

The SUT that has been instrumented using the variable-value instrumentation can be sent back to test-execution module 502 to re-execute tests that are affected by those instrumented components. While executing the tests, runtime variable values can be recorded and stored. The resulting spectrum data (e.g., passed and failed tests) and the recorded variable values can be sent to state-inspection module 510.

State-inspection module 510 can include a number of sub-modules that can partition the large amount of variable values into a smaller number of variable-value sets, with each set representing a state of the component. A component behaves similarly in tests when the variable values are within a given set. In some embodiments, state-inspection module 510 can include three sub-modules, a type-based-partitioning sub-module, a cluster-based-partitioning sub-module, and a label-based-partitioning sub-module. The type-based-partitioning sub-module can partition variable values using certain landmarks that are specific to the particular variable type. For example, for pointer variables, their values can be partitioned into a "null" group and a "not null" group; for numerical variables, their values can be partitioned into particular numerical ranges (e.g., ">0," "<0," and "=0"). The cluster-based-partitioning sub-module can perform cluster analysis on components based on their variable behaviors across test executions and extrapolates boundary predicates describing which cluster the component belongs to in order to determine the partitioning range of the variable values. The label-based-partitioning sub-module uses labeled data to partition predicates based on differences in variable behaviors between passing and failing test runs. After partitioning the variable values into different component states, state-inspection module 510 can generate an augmented spectrum to include the additional state information in the spectrum. A final augmented spectrum can be generated after a number of iterations to break all existing ambiguity groups, Diagnostic module 512 analyzes the final spectrum to generate a diagnostic report. Such a report can provide information regarding the likelihood of a component being the cause of test failure. The states of the components also provide qualitative descriptions, which can provide further contextual hints to the user (e.g., the programmer debugging the SUT) regarding the dynamic state of the SUT when a failure occurs, making it easier for the user to understand the fault. A programmer can debug the SUT based on the diagnostic report.

Compared with conventional SFL systems, the enhanced fault-localization system avoids the situation of ambiguity groups by collecting additional runtime information (e.g., variable values) and using this information to distinguish elements in the ambiguity groups. Therefore, the enhanced fault-localization system achieves better diagnostic accuracy. Moreover, the diagnostic efficiency can be improved by implementing an incremental approach that first determines which components (e.g., components in an ambiguity group involved in a failed test) should be further inspected. Limiting the state-based inspection to a small set of components makes it possible to perform the instrumentation and state analysis in an online fashion, as part of the test execution process without much delay to the end user. Selective re-instrumentation also allows the enhanced fault-localization system to focus the state inspection analysis on components of interest, rather than the entire SUT, thus providing scalability to large and complex SUTs.

Figure 6:
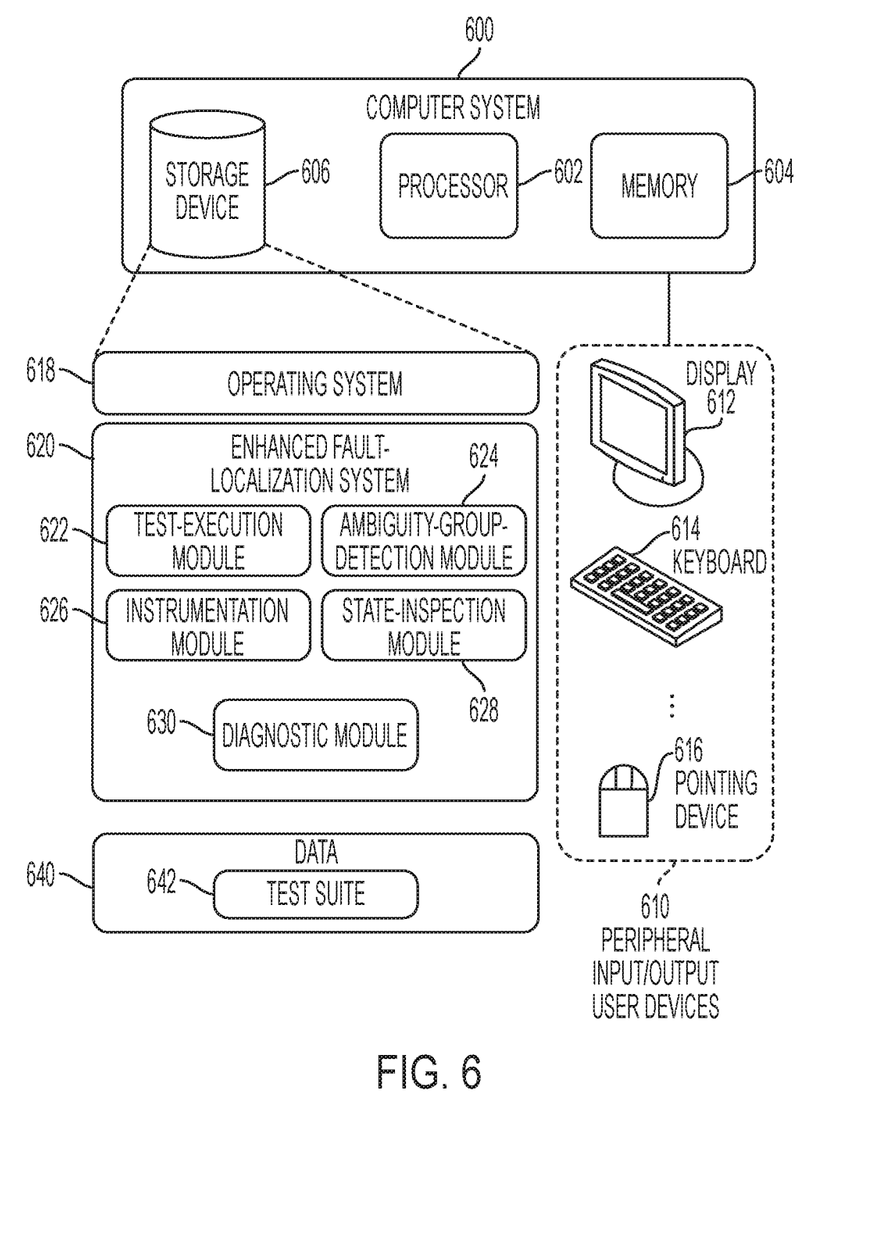
FIG. 6 illustrates an exemplary computer system, according to one embodiment.

FIG. 6 illustrates an exemplary computer system, according to one embodiment. Computer system 600 includes a processor 602, a memory 604, and a storage device 606. Furthermore, computer system 600 can be coupled to peripheral input/output (I/O) user devices 610, e.g., a display device 612, a keyboard 614, and a pointing device 616. Storage device 606 can store an operating system 618, an enhanced fault-localization system 620, and data 640.

Enhanced fault-localization system 620 can include instructions, which when executed by computer system 600, can cause computer system 600 or processor 602 to perform methods and/or processes described in this disclosure. Specifically, enhanced fault-localization system 620 can include instructions for executing tests (test-execution module 622), instructions for detecting ambiguity groups (ambiguity-group-detection module 624), instructions for instrumenting components (instrumentation module 626), instructions for inspecting the states (state-inspection module 628), and instructions for performing fault diagnosis based on the augmented spectrum (diagnostic module 630). Data 640 can include a test suite 642.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for automatically localizing faults in a software system, the method comprising:

executing, by a computer, a number of tests associated with the software system to output a spectrum indicating test-coverage patterns of components within the software system;

identifying, based on the spectrum, an ambiguity group associated with at least one failed test, wherein the ambiguity group comprises multiple components having a same coverage pattern;
instrumenting the multiple components, wherein instrumenting a respective component comprises inserting instructions for monitoring runtime values of at least one variable;
identifying a subset of tests within which the instrumented multiple components are active;
re-executing the identified subset of tests with the multiple components being instrumented; and
identifying one component from the multiple components as being likely to cause the at least one failed test based on results of the re-executed subset of tests.

2. The computer-implemented method of claim 1, further comprising:
identifying one or more states associated with a component based on the monitored runtime values of the at least one variable; and
determining coverage patterns of the component in different states.

3. The computer-implemented method of claim 2, wherein identifying the one or more states comprises partitioning the monitored runtime values of the at least one variable into a number of subsets, each subset corresponding to a state.

4. The computer-implemented method of claim 3, wherein partitioning the monitored runtime values of the at least one variable comprises one or more of:
applying a landmark-based partitioning technique;
applying a cluster-based partitioning technique; and
applying a label-based partitioning technique.

5. The computer-implemented method of claim 2, further comprising:
generating an augmented spectrum based on results of the re-executed subset of tests, wherein a respective row in the spectrum corresponds to a component in an identified state, and wherein a respective column in the spectrum corresponds to a test.

6. The computer-implemented method of claim 2, wherein the at least one variable comprises a numerical variable, and wherein a respective state corresponds to a predetermined numerical range.

7. The computer-implemented method of claim 2, wherein the at least one variable comprises a pointer variable, and wherein a respective state corresponds to the pointer variable being null or not null.

8. The computer-implemented method of claim 1, wherein executing the tests comprises:
performing a number of iterations; and
in each iteration,
decreasing instrumentation granularity;
filtering out components that are less likely to cause the at least one failed test based on results of a previous iteration; and
executing tests that are affected by remaining components.

9. A non-transitory computer-readable storage medium storing instructions that when executed by a computer cause the computer to perform a method for automatically localizing faults in a software system, the method comprising:
executing a number of tests associated with the software system to output a spectrum indicating test-coverage patterns of components within the software system;
identifying, based on the spectrum, an ambiguity group associated with at least one failed test, wherein the ambiguity group comprises multiple components having a same coverage pattern;
instrumenting the multiple components, wherein instrumenting a respective component comprises inserting instructions for monitoring runtime values of at least one variable;
identifying a subset of tests within which the instrumented multiple components are active;
re-executing the identified subset of tests with the multiple components being instrumented; and
identifying one component from the multiple components as being likely to cause the at least one failed test based on results of the re-executed subset of tests.

10. The non-transitory computer-readable storage medium of claim 9, wherein the method further comprises:
identifying one or more states associated with a component based on the monitored runtime values of the at least one variable; and
determining coverage patterns of the component in different states.

11. The non-transitory computer-readable storage medium of claim 10, wherein identifying the one or more states comprises partitioning the monitored runtime values of the at least one variable into a number of subsets, each subset corresponding to a state.

12. The non-transitory computer-readable storage medium of claim 11, wherein partitioning the monitored runtime values of the at least one variable comprises one or more of:
applying a landmark-based partitioning technique;
applying a cluster-based partitioning technique; and
applying a label-based partitioning technique.

13. The non-transitory computer-readable storage medium of claim 10, wherein the method further comprises:
generating an augmented spectrum based on results of the re-executed subset of tests, wherein a respective row in the spectrum corresponds to a component in an identified state, and wherein a respective column in the spectrum corresponds to a test.

14. The non-transitory computer-readable storage medium of claim 10, wherein the at least one variable comprises a numerical variable, and wherein a respective state corresponds to a predetermined numerical range.

15. The non-transitory computer-readable storage medium of claim 10, wherein the at least one variable comprises a pointer variable, and wherein a respective state corresponds to the pointer variable being null or not null.

16. The non-transitory computer-readable storage medium of claim 9, wherein executing the tests comprises:
performing a number of iterations; and
in each iteration,
decreasing instrumentation granularity;
filtering out components that are less likely to cause the at least one failed test based on results of a previous iteration; and
executing tests that are affected by remaining components.

17. A computer system for automatically localizing faults in a software system, the computer system comprising:
a processor; and
a non-transitory storage device storing instructions that when executed by the processor cause the processor to perform a method, the method comprising:
executing a number of tests associated with the software system to output a spectrum indicating test-coverage patterns of components within the software system;

identifying, based on the spectrum, an ambiguity group associated with at least one failed test, wherein the ambiguity group comprises multiple components having a same coverage pattern;

instrumenting the multiple components, wherein instrumenting a respective component comprises inserting instructions for monitoring runtime values of at least one variable;

identifying a subset of tests within which the instrumented multiple components are active;

re-executing the identified subset of tests with the multiple components being instrumented; and identifying one component from the multiple components as being likely to cause the at least one failed test based on results of the re-executed subset of tests.

18. The computer system of claim 17, wherein the method further comprises:

identifying one or more states associated with a component based on the monitored runtime values of the at least one variable; and determining coverage patterns of the component in different states.

19. The computer system of claim 18, wherein identifying the one or more states comprises partitioning the monitored runtime values of the at least one variable into a number of subsets, each subset corresponding to a state.

20. The computer system of claim 19, wherein partitioning the monitored runtime values of the at least one variable comprises one or more of:

applying a landmark-based partitioning technique;

applying a cluster-based partitioning technique; and applying a label-based partitioning technique.

* * * * *